United States Patent Office 3,281,140
Patented Oct. 25, 1966

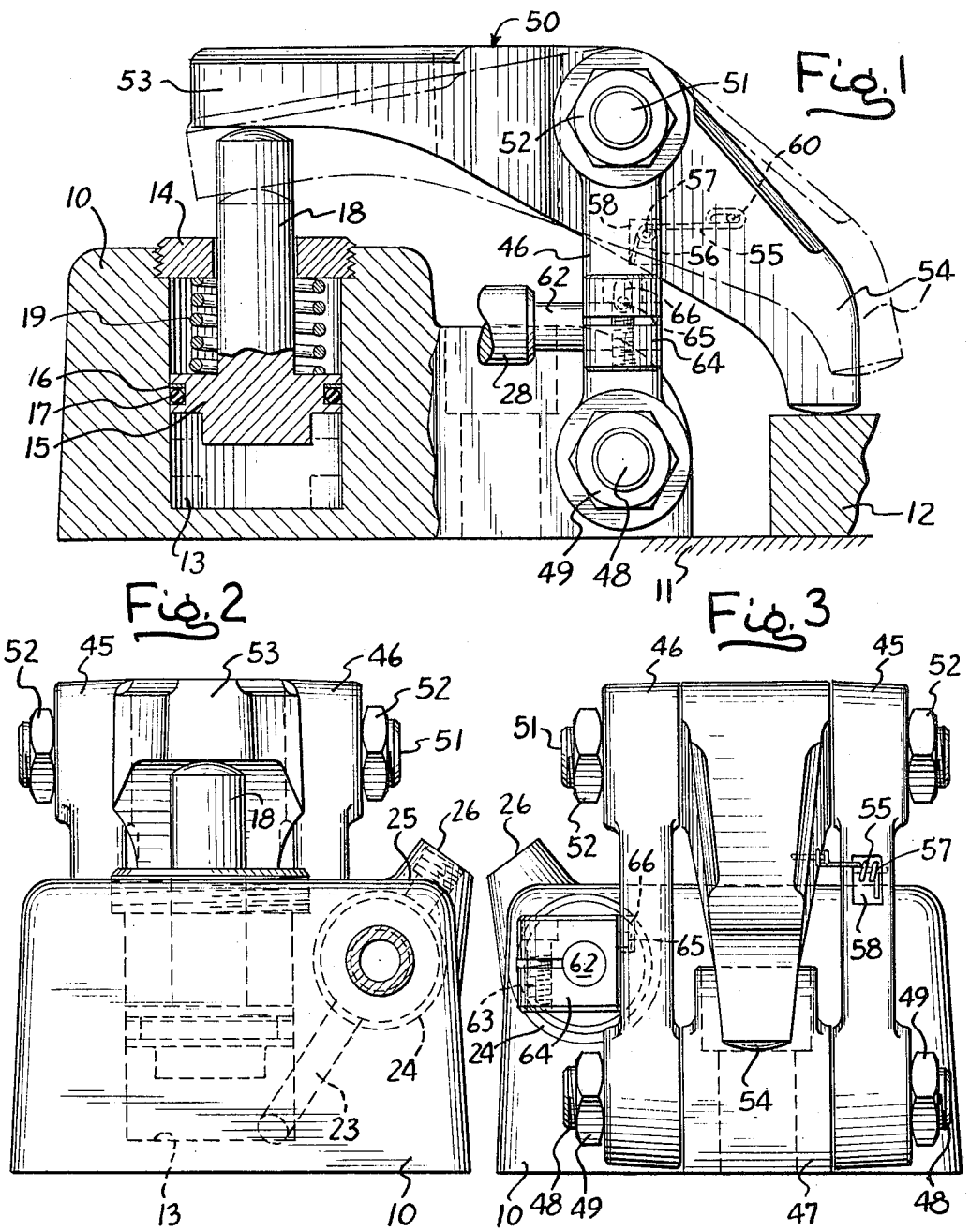

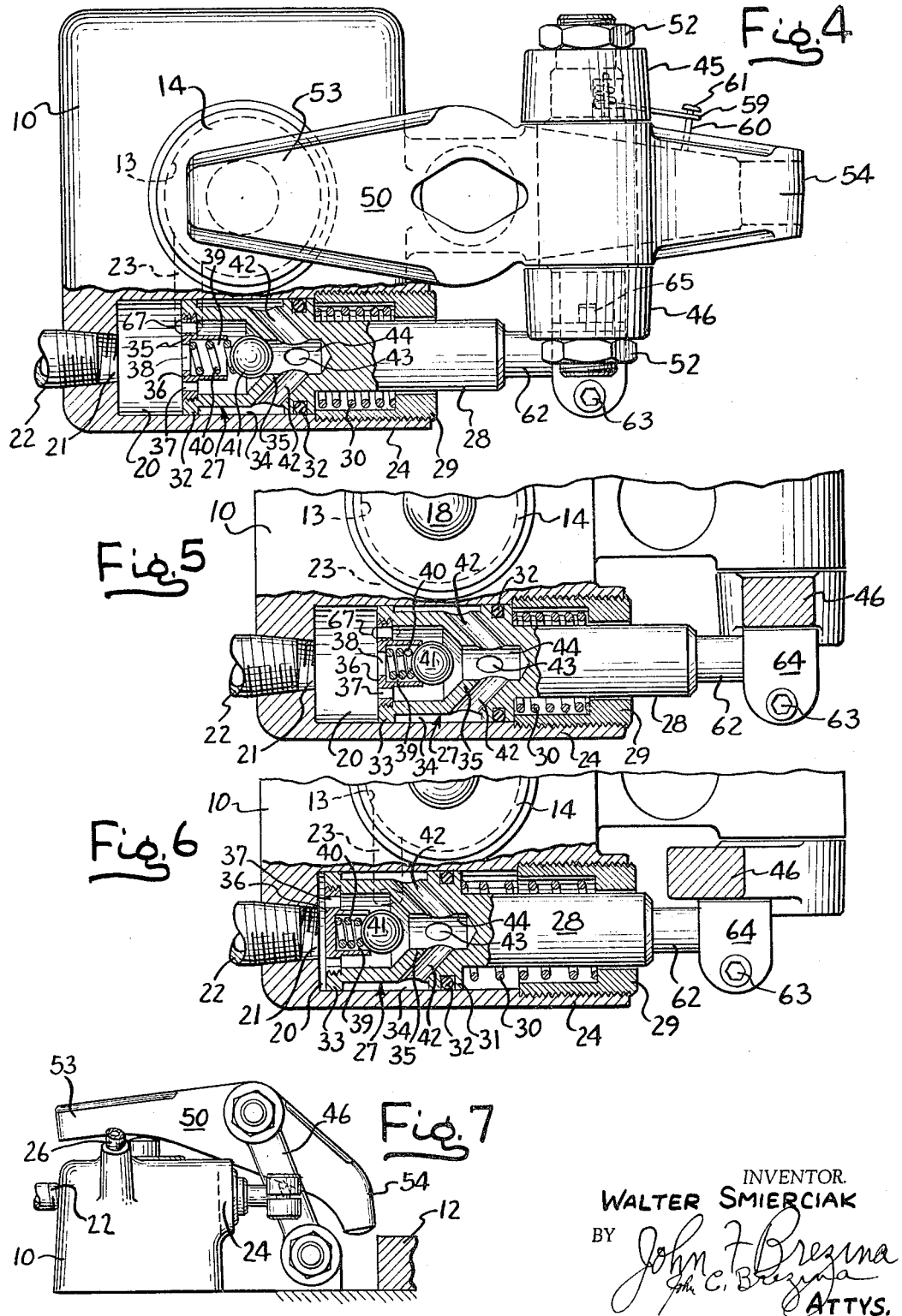

3,281,140
SLIDING CLAMP
Walter Smierciak, Elgin, Ill., assignor to Wilton Corporation, Schiller Park, Ill., a corporation of Illinois
Filed Dec. 2, 1963, Ser. No. 320,435
6 Claims. (Cl. 269—24)

The instant invention relates to work holding devices. More particularly, it relates to a sliding clamp adapted for fluid actuation.

In mass production, it is frequently necessary to perform certain operations, such as drilling, stamping and boring or the like, an oblique or irregularly shaped workpieces having large widths. To perform the operations, it is required that successive workpieces be clamped in position while work is being performed. For many operations, one or two clamps are not sufficient to hold workpieces in desired position.

While hydraulic clamps are well known in the art, using the conventional clamps is not entirely satisfactory, from the standpoint of economy of time. Because of irregular shapes on workpieces, conventional clamps have to be mounted and dismounted in order to permit positioning and withdrawal of each workpiece.

Employing conventional clamps will permit movement of the clamping jaw or work gripping member in a single direction, generally vertically. Accordingly, where the workpiece is circumferentially or peripherally gripped by a plurality of work holders or clamps, it is necessary to remove certain of the clamps to permit withdrawal of the workpiece.

The desirability of a work clamp which is capable of releasing the work and then having the clamping jaws moved out of the path of upward withdrawal of the work is evident. Through the use of conventional devices, in order to move the clamping jaws out of the path of withdrawal of the workpieces from the workbed, it is necessary to remove the clamp from the table or base upon which the same is mounted for each workpiece.

I have invented a clamping device adapted for holding workpieces on a workbed while various operations are performed, and which is adapted to be permanently mounted for clamping successive workpieces and then releasing the workpieces by sliding of the clamping jaws out of the path of upward withdrawal of the workpiece.

Through employment of devices such as are within the purview of this application, successive workpieces may be introduced upon the workbed by vertical lowering, then clamped, operated upon, unclamped and withdrawn in an upward path, without interference or impedence because of intruding or protruding clamping jaws.

In accordance with the instant invention, and as an object thereof, I have provided a clamping device in which the gripping jaw or work gripping member is carried upon a support which provides for movement of the clamp or gripping jaw in a vertical direction to grip and release the workpiece, and which also provides for movement of the clamp in a horizontal direction to place the clamp or jaw over the workpiece prior to withdrawal of the workpiece.

It is a further object of the invention to provide in a sliding clamp of the class described a fluid operated mechanism for regulating the sequence of the movement of the gripping jaw or clamp.

It is another object of the invention to provide a body adapted to accommodate hydraulic fluids and the like and to actuate a pair of pistons—one in a vertical direction and one in a horizontal direction—whereby the movement of the gripping jaw or clamp is controlled.

A yet further object of the invention is to provide a clamp or jaw support which is pivoted on the body and which pivotally supports the jaw or clamp medially its length whereby, upon pivoting of the jaw or clamp, the jaw or clamp moves in a horizontal direction to release or grip a workpiece and whereby, upon pivoting of the support, the jaw or clamp is slid in a horizontal direction over or out of the path of withdrawal of the workpiece.

Other and further objects of the invention will become apparent from the following description and appended claims, reference being had to the accompanying drawings and the numerals of reference thereon.

On the drawings:

FIG. 1 is a side elevational view of one embodiment of the invention showing in solid line the work clamping or gripping member in work locking position, and showing in dotted lines the work clamping or gripping member in work unlocking position, with portions to the left of FIG. 1 being shown in section for the purpose of illustration.

FIG. 2 is an elevational view looking at one end of the embodiment shown in FIG. 1, showing in dotted lines the hydraulic fluid chambers.

FIG. 3 is an elevational view looking at the embodiment from the end opposite to that shown in FIG. 2.

FIG. 4 is a view looking at the top of the embodiment shown in FIG. 1, with parts broken away illustrating the position of the horizontal piston when the device is in work gripping disposition.

FIG. 5 is a fragmentary view, partially in section, showing the disposition of the horizontal piston in work unlocking position.

FIG. 6 is a view similar to FIG. 5 but showing the horizontal piston retracted to slide the work gripping member or clamp out of the path of upward withdrawal of the workpiece.

FIG. 7 is a side elevational view of the embodiment seen in FIG. 1 and illustrating the gripping member or clamp slid out of the path of upward withdrawal of the workpiece.

Referring now more particularly to the drawings, the device comprises a body 10. The body 10, for successive pieces of the same kind of work, may be secured to or on a table, base, workbed or the like 11, and without the requirement to remove the device for successive pieces or work 12. The body 10 is provided with a plurality of bores or hollows. One bore or hollow 13 is of well-like configuration with its longitudinal axis in vertical disposition, as clearly illustrated in FIGS. 1 and 2.

A bearing ring or the like 14 is threaded into the body 10 at the upper end of the hollow or bore 13. A piston 15 is slidably mounted in the hollow or bore 13; and in an annular peripheral groove 16 of said piston 15 there is disposed a sealing ring 17 to contain hydraulic fluid. The piston 15 has a reduced or stem-like upwardly extending portion 18 which extends upwardly through the bearing ring 14. A compression spring 19, the opposite ends of which bear respectively against the ring 14 and the piston 15, as illustrated in FIG. 1, tends to drive the piston 15 downwardly to the dotted line position shown in FIG. 1.

Another bore or hollow 20 is provided in a cylinder-like extension 24 of housing 10. The longitudinal axis of the bore 20 is horizontally disposed, as illustrated in the drawings. A fluid inlet port 21 is in fluid communication with the horizontal bore 20 and represents the limit of a housing aperture in which a fluid delivery nipple or fitting 22 is adapted to be mounted, as illustrated in FIGS. 1, 2 and 3.

Within the housing 10, an additional bore, passage or hollow 23, which extends upwardly from the lower end of the well 13 to the horizontal bore 20, places these two chambers 13 and 20 in fluid communication with each other. To bleed off excessive pressure, I provide a port 25 with a manually withdrawable plug 26. The port 25 is in fluid communication with the bore or hollow 20.

A horizontally movable piston, generally designated by the numeral 27, is disposed within the bore or hollow 20. A reduced end or stem 28 of piston 27 extends through the central aperture of a bushing 29 which is threaded in the end of the cylinder 24, as illustrated in FIGS. 4, 5 and 6. The opposite ends of a compression spring 30 bear respectively against the piston flange 31 and the bushing 29 and tend to drive the piston 27 to the left with respect to FIGS. 4, 5 and 6. A sealing ring 32 mounted in the periphery of flange 31 seals the flange against the passage of fluids.

The inner end portion of the piston 27 is defined by the piston flange 31 and an end flange 33, the exterior diameters of which are substantially the same as the interior diameters of the bore 20. Between the flanges 31 and 33, the piston body is reduced to provide a fluid trough 34. The inner end portion of the piston 27 is reamed out to provide a centrally apertured ball seat 35. Flange 33 has threaded therein a bushing 36 having an annular slot 37 and a central aperture 38. The bushing 36 provides a well 39 in which there is disposed a compression spring 40 which bears against a ball check 41 normally urging it into the ball seat 35, the normal or closed position being illustrated in FIG. 4. Radiating canals 42 provide a fluid communication between the fluid trough 34 and an extension 44 of the inner hollow of piston 27 through a port 43.

A clamp or jaw support is provided and comprises a pair of upwardly extending arms 45 and 46. The arms 45 and 46 are disposed in substantially parallel relationship on opposite sides of a narrowed body extension 47, as illustrated in FIG. 3, with their lower end portions mounted for rotation on pins 48 and secured in position by nuts 49 threaded on the exterior of the pins 48. Accordingly, the arms 45 and 46 are capable of a rocking movement to the right and to the left, with respect to FIGS. 1, 4, 5 and 6.

A work ripping member generally designated by the numeral 50 is pivotally mounted on a pin 51. The pin 51 is secured in the upper end portions of the arms 45 and 46 by opposed lock nuts 52 mounted on the opposite threaded end portions of pin 51. Pin 51 extends through a medial portion of the gripping member 50 which is pivotally mounted thereupon. The gripping member 50 has an end portion 53 which extends toward the left, with respect to FIG. 1, to engage the upper end of the stem 18 and has a downwardly bent nose, jaw or clamp portion 54 adapted to releasably engage and clamp the workpiece 12 against the workbed 11.

It is apparent now that, as the stem 18 moves upwardly, the gripping member 50 will pivot about the pin 51 to clamp down upon the workpiece 12; and as the stem 18 moves downwardly, with respect to FIG. 1, the clamp or jaw 54 is free to move upwardly in a vertical direction to unlock the workpiece 12. To keep the end portion 53 of the gripping member 50 in engagement with stem 18 when the stem 18 moves downwardly, I provide a tension spring 55, one end 56 of which is secured on a pin 57 mounted in a recess 58 in the arm 45, as illustrated in FIGS. 1 and 3. The opposite end 59 of the tension spring 55 may be looped about a pin 60 in the fashion illustrated in FIG. 1 to accommodate the pivoting action of the gripping member 50. It is seen, of course, that the inner end of the pin 60 is secured on the clamp or jaw portion 54 of the gripping member 50 and that the end portion 59 of the spring 55 is retained by a boss or head 61 on As illustrated in FIGS. 1, 3, 4 and 5, the stem or end portion 28 of the piston 27 has an integral rigid outwardly extending horizontally movable arm or end portion 62. The arm 62 has secured thereon, by means of fasteners such as screws or the like 63, a split bearing block 64 which rides against the side of arm 46, as clearly illustrated in FIGS. 1, 3, 4, 5 and 6. A drive pin 65 is carried on the inner surface of the block 64 and rides in a slot 66 in the arm 46, as illustrated in FIGS. 1, 3 and 4, permitting sliding of the arms 45 and 46 in a horizontal direction on the pin 48.

Having thus described the features of construction of the embodiment of the invention illustrated, a brief description of the operation follows: Commencing with the solid line position of the gripping member 50 shown in FIG. 1, with the workpiece 12 gripped by the device the fluid pressure is released at an external position (not shown) by an operator. Thereupon the device experiences the unlocking stroke. That is, with release of the fluid pressure, the spring 19 will overcome the force holding the stem 18 in the solid line position shown in FIG. 1 and drive piston 15 to the dotted line position shown in FIG. 1 while, simultaneously, tension spring 55 causes end portion 53 of the gripping member 50 to follow stem 18 and release the workpiece 12.

With the fluid pressure released, the fluid which is trapped in the trough 34 will flow downstream through the canals 42 through the port 43 to unseat ball check 41 which will assume the position illustrated in FIG. 5. With the pressure in trough 34 thus relieved, piston 27 is driven to the left, with respect to FIGS. 4, 5 and 6, under the action of spring 30 to the position illustrated in FIG. 6. As movement of piston 27 to the left, with respect to FIG. 4, commences, a port 67 at the upper end of the bore 23 empties fully in the trough 34 to accentuate further movement of the piston 27 to the left. As piston 27 moves to the left, arm 46, and with it arm 45, is drawn to the left by reason of the action of drive pin 65 in slot 66. The latter movement in a horizontal plane now has caused sliding of the gripping member 50 out of the path of the workpiece 12, as illustrated in FIG. 7.

To reset the device in clamping position, fluid under pressure is introduced through fluid inlet port 21, whereupon the pressure extension stroke occurs. That is, the piston 27, under action of the fluid, is driven to the right, with respect to FIGS. 5 and 6, to move gripper member 50 to the dotted line position of FIG. 1. After the pressure extension stroke, the position of ball check 41 is as illustrated in FIG. 5. Thereupon, further introduction of fluid results in a downward flow into the well 13, whereupon the spring 40 causes the ball check 41 to seat. Thereafter, continued introduction of fluid results in the same passing through the port 67 against the piston 15 to elevate the end 53 of gripping member 50 to rock the jaw portion 54 downwardly to engage and grip the workpiece 12.

While I have shown in the drawings and described, as one embodiment of this invention, a hydraulically operated device, it is appreciated, of course, that the invention contemplates use of a plurality of fluids well known in the art, such as air from a source of compression.

As many changes or substitutions could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. A clamping device comprising a body providing a vertically disposed cylinder and a horizontally disposed cylinder,
   a piston disposed in each of said cylinders and extendable therefrom;
   means for operating said pistons;
   a work gripping member operably connected to said pistons whereby said work gripping member is adapted to move horizontally and vertically, said work gripping member being mounted upon a pair of arms pivotally secured to said body, said work gripping member being pivotally secured to said arms.

2. The clamping device defined in claim 1 in which an end portion of said gripping member is operably connected to the piston in said vertical cylinder and the piston in said horizontal cylinder is connected to one of said arms medially of the connection thereof to said body and said work gripping member.

3. A clamping device adapted to engage and release a workpiece by vertical and horizontal movement, comprising a body having a pair of bores, one of said bores disposed horizontally and one of said bores disposed vertically, said bores in fluid communication; a piston vertically reciprocable disposed in the vertical bore; a piston reciprocable horizozntally disposed in said horizontal bore; a work gripper support pivotally secured for movement about a horizontal axis at its lower end portion to said body and extending upwardly; a work gripping member pivotally secured to said work gripper support, an end portion of said work gripping member operably connected to said vertically reciprocable piston, said horizontally reciprocable piston connected to said work gripper support.

4. The clamping device defined in claim 3 in which said body provides a fluid conduit extending downwardly from the horizontally disposed bore to the vertically disposed bore and which comprises the fluid communication between said bores and a fluid entry port into said vertical bore.

5. The clamping device defined in claim 4 further characterized by means including said pistons for controlling the sequence of movement of said work gripping member.

6. A clamping device comprising a body having a vertical bore, a horizontal bore, a fluid conduit extending upwardly from said vertical bore to said horizontal bore, and a hydraulic fluid entry port in fluid communication with said horizontal bore; a spring-pressed vertical piston disposed in said vertical bore and extendable upwardly therefrom; a hollow spring-pressed horizontal piston disposed in said horizontal bore and extendable horizontally therefrom; means including a check valve in one of said pistons for alternating reciprocation of said pistons; a work gripping member having an end portion thereof in engagement with an extended end of said vertical piston; a support for said work gripping member pivotally connected at its lower end portion to said body and at its upper end portion pivotally connected to a medial portion of said work gripping member, and a link mounted on the outer end portion of said horizontal piston and operably secured to a medial portion of said support, whereby said work gripping member is movable horizontally and vertically.

References Cited by the Examiner

UNITED STATES PATENTS 3,173,673   3/1965   Northern et al. _____ 269—32

HAROLD D. WHITEHEAD, *Primary Examiner.*

ROBERT C. RIORDON, *Examiner.*

F. J. POWERS, *Assistant Examiner.*